United States Patent Office
3,394,345
Patented July 23, 1968

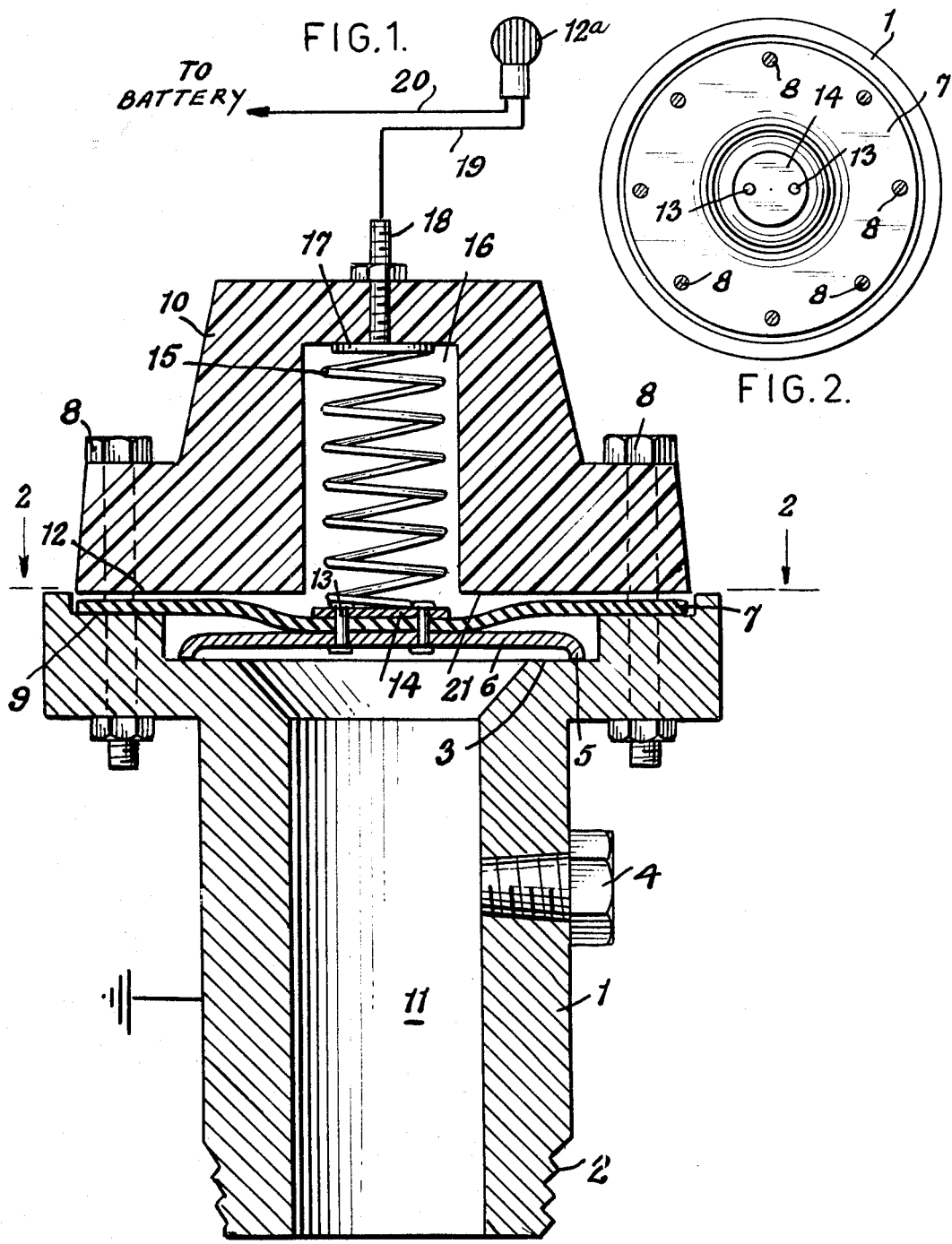

3,394,345
SIGNAL MEANS FOR INDICATING RESIDUAL HYDRAULIC PRESSURE IN A BRAKE SYSTEM
Edward M. Thomas, 122 Bement Ave.,
Staten Island, N.Y. 10310
Filed Sept. 17, 1965, Ser. No. 488,065
2 Claims. (Cl. 340—52)

ABSTRACT OF THE DISCLOSURE

A signal means for a hydraulic brake system in which a residual hydraulic pressure is maintained at a given value, and in which a cylinder is connected into the system. The cylinder contains a spring-biased diaphragm to which a metallic disk is attached. The disk forms a closure for one end of a passage that extends through the cylinder and closes signal means when the residual pressure therein is at a low value. When the pressure is at a required value and is exerted against the disk, the disk moves away from the end of the fluid passage, and the diaphragm is flexed by the pressure to bring electrical contact means into operativeness to open contact to a signal and indicate the existence of the proper residual fluid pressure in the system.

---

This invention relates to hydraulic brake systems for motor vehicles and has particular reference to a means by which a lowering of the hydraulic fluid pressure in the system will be rendered apparent to the operator of the vehicle to thereby warn him of leakage by the components of the system. An arrangement of this kind is shown in my co-pending application Ser. No. 452,680, filed May 3, 1965, and this invention is an improvement thereon.

It is a fact that all hydraulic brake systems maintain a slight residual fluid pressure in the entire hydraulic system, and this pressure, which is usually between eight and twelve pounds, is existent when the brake pedal is not depressed or in other words is in the release position. This residual pressure is maintained in the hydraulic system by means of a spring located in the master cylinder and which seats a valve to maintain the pressure within the lines and in the brake cylinders at eight to twelve pounds. This is done in order to prevent air from entering the system and for other reasons, while the brake pedal is in the released position.

It is an object of the present invention to provide a means by which the vehicle operator can be warned of potential brake trouble, often caused by leakage, even when slight. It is an object of the invention to provide a warning signal means communicating the evidence of leakage to a car operator before he depresses the brake pedal and not after he tries to apply the brake. When evidence of leakage is thus brought to the attention of the car operator he will be alerted and can immediately have the car checked for possible repair to the brake system.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a longitudinal sectional view of a switching device for actuating a signal to indicate sub-normal residual pressure in an automotive brake system, and FIG. 2 is a view taken substantially on the line 2—2 of FIG. 1 and on a smaller scale, looking in the direction of the arrows.

Referring to the drawing, 1 indicates a cylinder or housing forming a part of the signal-transmitting device, the cylinder 1 being adapted to be installed between the master cylinder of the brake system and the main line to the brakes, such as by having its threaded end 2 installed in a T connection in the line and grounded by such connection. In cases where dual master cylinders are employed, two of the switches to be described may be used. At 4 is shown a removable bleeder plug which in the installation of the cylinder 1 is disposed upwardly with reference to the automobile.

The cylinder or housing 1 is formed at one end with an annular seat or ledge 3 adapted to be contacted by the flanged peripheral edge portion 5 of a metallic disk 6 which is attached to a flexible diaphragm 7 composed of insulating material. Said diaphragm 7 is attached, adjacent to its periphery, by a plurality of screws or bolts 8, between a shelf or ledge portion 9 on the metallic cylinder 1 and a closure cap 10 that is composed of insulating material. The diaphragm 7 is actually clampingly held in place between the cap 10 and the shelf or ledge 9. In the drawing, the parts are shown in slightly spaced relation to more clearly disclose the mounting. As will be hereinafter described, the diaphragm is capable of being flexed so that it will be in either the position shown in FIG. 1, under a drop in the residual pressure in the chamber 11 of the cylinder 1, or else will be flexed toward the surface 12 of the cap 10. In the latter position of the diaphragm, the disk 6 attached to the diaphragm by the rivets 13, will be moved away from and be free of electrical and physical contact with the metallic cylinder or housing 1, thus breaking the circuit to the warning light or signal lamp shown at 12a.

The insulated cap 10 is attached to the cylinder or housing 1 by means of the bolts or screws 8. The rivets 13 which attach the contact disk 3 to the diaphragm 7 also attach a metallic plate 14 to said disk and to the diaphragm, the diaphragm being thus sandwiched between the disk 6 and the circular plate 14 as clearly shown in FIG. 1. By means of the rivets 13 an electrical connection is established between the disk 6 and the plate 14.

A coil spring 15 is housed in a recess 16 formed within the cap 10, said spring having one end in contact with or attached to the plate 14, and its opposite end in contact with a disk 17 provided on a binding post 18 mounted in the end of the insulating cap 10. A suitable lead 19 extends to one contact of the signal lamp or warning light 12a, the second contact thereof being connected to the car battery or into the ignition system via the wire 20.

From the foregoing, the operation of the described device will be apparent. In the installation of the described device, the master cylinder of the brake system is filled with the hydraulic fluid; the bleeder plug 4, which is directed upwardly, is removed to vent air and is then replaced. The brake pedal should then be firmly depressed to determine if leakage exists. There is at this time between eight and twelve pounds pressure in the chamber 11, which pressure depends upon the spring that is located in the master cylinder, and which pressure holds the diaphragm 7 against this surface 12 of the cap 10 so that the contact disk 6 is thus free from contact with the shoulder 3 of the housing 1 and the circuit to the lamp 12a is thus broken.

This arrangement is such that while the brake system is in a static condition or while no foot pressure is being applied to the brake pedal, and with normal residual pressure in the system, the circuit to the warning light 12a will be open and the lamp 12a unlit.

The installer of the device can readily test the operativeness and effectiveness of the device by removing the bleeder screw 4, dropping the residual pressure in the lines to a point below the bias of the spring 15, whereupon the spring 15 will then flex the diaphragm 7 to an extent to bring the contact disk 7 against the shoulder 3 of the cylinder 1 to thus close the circuit to the red lamp 12a and illuminate the same to indicate residual pressure drop in the brake system.

While I have herein suggested that a light 12a can be used, an audible signal such as a buzzer can also be employed to indicate a reduction of residual pressure in the brake line.

It will be apparent from the foregoing, that as long as the normal residual fluid pressure is present in the brake system, the lamp 12a will remain extinguished when the ignition key is turned on. However, when there is a lowering of the residual pressure due to leakage or for some other cause, then the spring 15 will become effective to flex the diaphragm 8 and cause the disk 6 to contact the grounded housing 1 and close the circuit to the lamp 12a and illuminate the same and thus indicate to the car operator the need for repair to the brake system to correct leakage and restore the normal residual fluid pressure.

Having thus described an embodiment of the invention, it is obvious that the same is not to be restricted thereto, but is broad enough to cover all structures coming within the scope of the annexed claims.

What I claim is:

1. In a hydraulic brake system in which a residual hydraulic fluid pressure is maintained at a given value, a cylinder connected into the system and providing a chamber in which the fluid under said residual pressure is maintained, said cylinder including a base portion composed of electrically-conductive material, said base portion having a passage into which the fluid under residual pressure enters, an annular seat in the base portion around one end of said passage, a metallic disk resting against the seat and closing said end of the passage as long as the residual pressure in the passage is below a predetermined value, a flexible diaphragm attached to the disk, a cover of nonmetallic material fitted over the base, the marginal edge of the diaphragm being clampingly held between the cover and base, spring means operative on the diaphragm for holding the disk against the seat and causing said disk to close the end of the passage and complete an electrical circuit through a warning device as long as the residual pressure in the passage is insufficient to overcome the force of the spring, and the disk being forced away from the seat when the residual pressure is sufficient to overcome the force of the spring, whereby the end of the passage will be uncovered by the disk and the fluid under residual pressure of given value will reach the diaphragm and will flex it, and means for opening circuit to a signal while the diaphragm is flexed and the passage is uncovered by the fluid under the given residual pressure.

2. In a hydraulic brake system, a signal device, a switch in a circuit leading thereto, said switch including a cylinder connected into the hydraulic brake system and having a passage containing hydraulic brake fluid under pressure of a certain value while the brake pedal is not under depression, a flexible diaphragm disposed across one end of the passage in the cylinder, said diaphragm carrying a metallic contact disk located between it and a metallic part of the cylinder and with said disk normally held out of contact with the metallic part of the cylinder as long as the residual pressure of a required value is maintained within the cylinder, spring means operative on the disk to bring the disk into direct contact with the metallic part of the cylinder upon a reduction of the residual pressure within the cylinder, and said disk constituting a closure for one end of the passage while also forming a circuit-closing element of the switch when it is brought into contact with the metallic part of the cylinder by the pressure of the spring.

References Cited
UNITED STATES PATENTS 3,090,848   5/1963   Scholz _____ 200—83

JOHN W. CALDWELL, *Primary Examiner.*

A. WARING, *Assistant Examiner.*